United States Patent Office 2,812,464
Patented Nov. 5, 1957

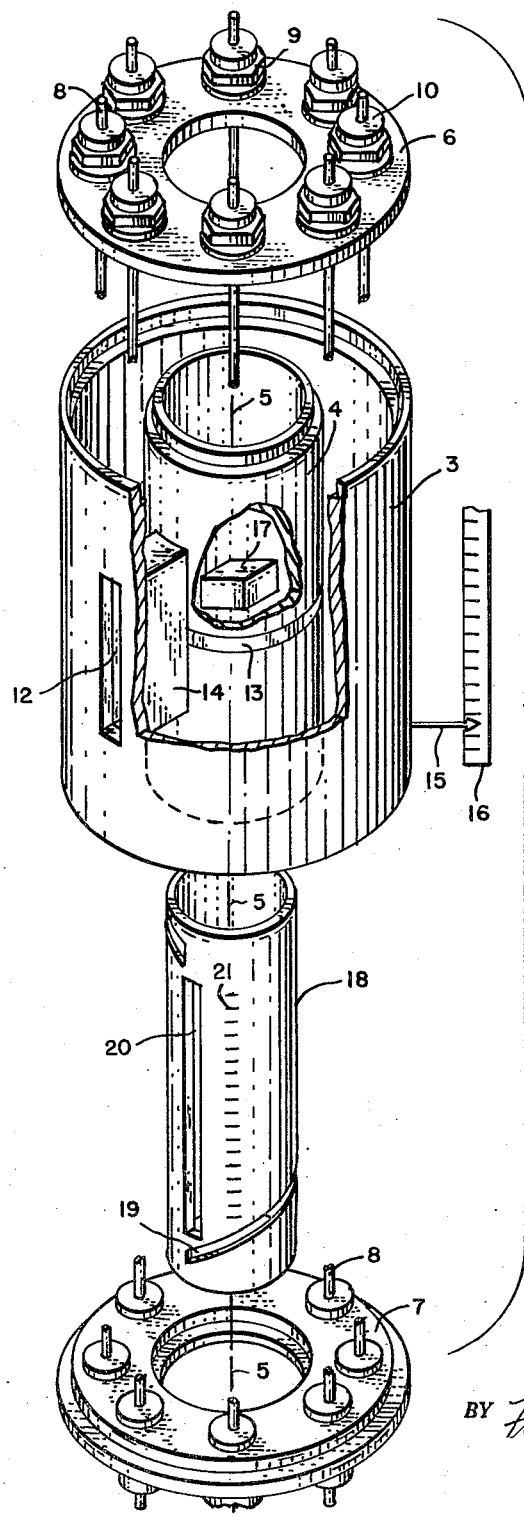

2,812,464

PHOTON COUNTER APPARATUS FOR X-RAY DIFFRACTION STUDIES

Ray Pepinsky, State College, Pa., assignor to the United States of America as represented by the Secretary of the Army Application August 16, 1955, Serial No. 528,850

4 Claims. (Cl. 313—93)

This invention relates to a novel device consisting of a combination of a photon counter tube of the gaseous discharge type and an accompanying screen to be used in X-ray diffraction studies.

In order to determine certain properties of crystals by X-ray diffraction studies, it is important to know the directions of egress from a crystal of the diffracted beams resultant from an X-ray beam incident upon the crystal. Heretofore, it has been necessary to mount a photon counter used to determine the directions of egress from the crystal of the diffracted beam so that the device could be moved both in a circle about the crystal and in a direction normal to this circle. Disadvantages of such a method and the apparatus required to practice it are evident.

It is an object of this invention to provide a novel device consisting of a combination of a photon counter tube and an accompanying screen whose operation facilitates the determination of the direction of egress from a crystal of X-rays diffracted from the crystal.

It is a further object of the invention to provide a simple, accurate and easily manipulated apparatus for determining the relative direction of a beam of incident radiation.

It is a still further object of the invention to provide a photon counter equipped with an adjustable direction determining radiation mask or screen.

Other objects and advantages will be apparent from the following detailed description and the accompanying drawing wherein:

The single figure is an exploded perspective view of a photon counter and screen constructed in accordance with the principles of the invention.

The basic design of the photon counter apparatus follows. The photon counter tube walls consist of two coaxial tubular members and two annular end-plates which are assembled to form a cylindrical shell. The cylindrical shell has therein an X-ray window which is a radiation permeable strip mounted in the inner tubular member. This strip is arcuate in form and its longitudinal centerline runs in a circle lying in a plane which cuts the cylinder axis at right angles. A portion of the cylindrical shell acts as the cathode structure of the photon counter. The shell may be filled with an ionizable gaseous medium in a manner well known in the art. The anode of the counter tube consists of wires centrally located within the shell and running parallel to the cylinder axis. The counter operates somewhat as a plane parallel plate type, with parallel collection wires.

Inside the inner cylindrical tubular member is a cylindrical screen or mask formed of a material which is impervious to the diffracted beams. This screen has two slots or windows, both pervious to beams of X-rays, a helical slot about the circumference of the cylinder and a rectangular slot running parallel to the cylinder axis. The counter shell and the screen or mask are relatively movable to determine radiation beam direction in a manner which will be more fully described hereinafter.

One form of the photon counter which has been constructed in accordance with the principles of the invention is shown in the accompanying figure of the drawing. The counter is formed of two coaxial cylindrical tubular members as cathode side-walls 3 and 4. The two cathode side-walls 3 and 4 are centered about a common axis 5—5, and are each made of a suitable cathode material, such as brass. The side-walls 3 and 4 are connected by air-tight joints at the top and bottom to two identical annular plates or end-walls 6 and 7.

Since the end-walls 6 and 7 are identical, only one of them, the top end-wall 6, will be described. The top end-wall 6 is a sheet of a suitable material to which a plurality of anode wires 8 are attached by suitable fastening means (such as machine screws 9) and sealing means (such as feedthroughs 10). The anode wires 8 are of suitable construction and all extend in a direction parallel to the common axis 5—5 the length of the counter from the top end-wall 6, to the bottom end-wall 7. The anode wires are separated from the cathode side-walls by suitable insulating means.

A side window 13 is provided which consists of a circular strip in a plane cutting the common axis 5—5 at right angles. A circular slot is milled into the counter side-wall 4, and is covered with a metal strip or foil (e. g. of beryllium) having approximately the same dimensions as the slot and pervious to the diffracted radiation beams. A primary X-ray beam aperture 12 is defined by a tubular shell 14 of rectangular cross-section connecting the side-walls 3 and 4. A pointer 15 projects normally outward from the outer surface of the outer cathode side-wall 3 and cooperates with a layer line scale 16. A crystal 17 which is to be examined is placed on the common axis 5—5. The scale 16 extends in a direction parallel to the common axis 5—5 and is fixed in position with respect to a support (not shown) for the crystal 17. The cooperation of the pointer 15 and the scale 16 allows measurement of the displacement of the counter with respect to the crystal 17 in the direction of the common axis 5—5.

As shown in the figure, extending from the bottom of the inside of the inner counter side-wall 4, there is a cylindrical screen 18 which fits inside the counter and has an outside diameter which is slightly less than the inside diameter of the counter. The screen has cut in it two slots both pervious to the radiation beams. A constant pitch helical slot 19, having approximately the same width as the counter side window 13, and a rectangular slot 20, extending in a direction parallel to the common axis are provided. It is apparent that when the screen is inserted in the space defined by the inner side-wall that the helical slot 19 and the circular side window 13 overlap one another in some common area. Displacement of the screen relative to the counter in the direction along the common axis 5—5, will cause this common area to be angularly displaced about the circle defined by the counter circular side window 13. The angular displacement from any given zero reference point of this common area on the circle defined by the circular counter side window 13 may be measured in degrees by an angular displacement scale 21 on the outer surface of the screen 18. The scale 21 extends in the direction of the common axis 5—5 along the screen and cooperates with an index such as the lower edge of the end plate 7.

The tubular members 3 and 4 and the end plates 6 and 7 are hermetically sealed to form a hollow toroidal photon counter shell. The sealed space within the toroid counter shell may be filled with any suitable ionizable gaseous medium such as a mixture of 90% xenon and 10% methane, at a total pressure of approximately 76 centimeters of mercury. The particular gaseous medium and pressure used will be determined by the type of radiation applied to the crystal. Any desired electrical circuit may be connected to the anode and cathode members to indicate firing of the tube due to ionization of the gaseous medium by a beam of radiation.

The dimensions of a typical apparatus constructed in accordance with the basic design of the invention is as follows. The counter cathode side-walls 3 and 4, have a length of 10 cm. and diameters of 6 and 12 cm. respectively. The annular end-walls 6 and 7, each have inside diameter of approximately 6 cm. and an outside diameter of 12 cm. The anode wires 8 are fastened to the end-walls 6 and 7 by the machine screws, equally spaced about the circumference from the common axis 5—5. These screws are drilled axially and connected respectively to their corresponding anode wires 8 by the corresponding feedthroughs 10. The feedthroughs may be made of Kovar or other suitable sealing material.

The mode of operation of this apparatus will now be described. The crystal 17 to be investigated is placed on the axis of the counter in such a position that it may be irradiated by an X-ray beam entering through the primary X-ray beam aperture 12 and the rectangular slot 20 which have been previously aligned. The primary X-ray beam strikes the crystal 17 and several diffracted beams result which terminate at different points on different layer lines. Layer lines are defined as circles of varying distances apart on a cylinder of a fixed radius whose axis runs through the crystal. Given (1) the radius of the cylinder, (2) the particular layer line on the cylinder, and (3) the azimuthal angle from a given zero reference point on this layer line, the direction of egress of a particular diffracted beam may then be determined. The diffracted rays emerging from the crystal 17 strike the inner surface of the screen 18 on particular layer lines and on each layer line at a different azimuthal angle. The screen 18, and the counter are each independently moved in the direction of the common axis 5—5, until the photon counter tube is triggered. This indicates a diffracted beam has hit the area where the spiral slot 19 and the side window 13 are superimposed. The reading on the scale 21 which has previously been calibrated for a zero reference line gives the displacement of the screen 18 relative to the counter in the direction of the axis of the counter 5—5, and thus gives the proportionate angular displacement from the zero reference line of the area where the spiral slot 18 and the side window 13 are superimposed. The particular layer line of the refracted beam is noted by determining the relative displacement of the counter shell with respect to the crystal as measured by the pointer 15 in cooperation with the scale 16. Thus, the direction of egress from the crystal of a diffracted beam which has hit the area where the spiral slot 18 and the side window 13 are superimposed is determined by (1) the inner radius of the cylindrical counter, (2) the displacement of the screen 18 relative to the counter, and (3) the displacement of the counter relative to the crystal.

The operation of the direction determining counter constructed in accordance with this invention requires only two movements. Both the screen and the counter shell need be displaced only in the direction of the common axis 5—5. Thus this operation facilitates the determination of the directions of egress from a crystal of X-rays diffracted from the crystal.

While there has been described what is at present considered to be the preferred embodiment of this invention, it will be obvious to those skilled in the art that various changes and modifications may be made therein without departing from the invention, and it therefore is the aim of the appended claims to cover all such changes and modifications as fall within the true spirit and scope of the invention.

What is claimed is:

1. An hermetically sealed radiation counter comprising an inner cylindrical cathode member, and an outer cylindrical cathode member, both concentric about a common axis, a pair of end wall plates connecting said cathode members at the ends thereof, a tube of rectangular cross section located between said end wall plates and connected between said cathode members with its axis extending radially from said common axis, at least one side-wall window in said inner cathode cylindrical cathode member, said window consisting of an arcuate circular radiation pervious strip, an anode structure consisting of at least one wire extending between and securely attached to said end wall plates in the space enclosed by said end wall plates and said cathode members, in such a manner that said anode structure is electrically insulated from said cathode members, a pointer projecting outward from the outer surface of said outer cathode member, a scale parallel to said common axis and cooperating with said pointer to indicate displacement of said counter, a cylindrical radiation impervious screen placed between said inner cathode member and said common axis having both a helical and a rectangular radiation pervious slot cut therein and adapted for sliding motion along the inner surface of said inner cathode member in the direction of the common axis, a scale on the outer surface of said screen extending in a direction parallel to said common axis and cooperating with one of said end wall plates to indicate the angular displacement of the area in which said arcuate circular strip and said helical slot are superimposed, an ionizable gaseous medium filling the space enclosed by said cathode side-wall members and said end-wall plates whereby the direction of egress of any of the beams refracted from an X-ray beam incident upon a crystal placed inside the counter is determined.

2. A radiation counter comprising an hermetically sealed hollow toroidal cathode shell, at least one anode strcture mounted within said hollow cathode shell and electrically insulated therefrom, an arcuate radiation permeable window in the inner wall of said toroidal cathode shell, a cylindrical radiation impervious screen member having a helical slot therein, said cylindrical screen being fitted between the inner wall of said shell and the axis of said shell and movable along the axis of said shell and index means for measuring the relative axial displacement of said cylindrical screen and said hollow toroidal shell.

3. An angular direction determining radiation counter comprising an hermetically sealed hollow toroidal cathode shell, an anode structure mounted within said hollow cathode shell and electrically insulated therefrom, an arcuate radiation permeable window in one wall of said of said toroidal cathode shell, a cylindrical radiation imprevious screen having a helical slot therein being fitted between the inner wall of said shell and the axis of said shell and movable along the axis of said toroidal shell in cooperative relations with the wall thereof containing the said arcuate radiation permeable window and index means for measuring the relative axial displacement of said cylindrical screen and said hollow toroidal shell.

4. An angular direction determining radiation counter according to claim 3 wherein said hermetically sealed hollow toroidal shell is filled with an ionizable gaseous medium.

References Cited in the file of this patent

UNITED STATES PATENTS 2,374,197    Hare                 Apr. 24, 1945

OTHER REFERENCES

Geiger Counter Tubes, by Herbert Friedman, reprinted from the Proceeding of the I. R. E., vol. 37, No. 7, July 1949, pp. 806 and 807 (Fig. 31).